United States Patent [19]
Morris

[11] Patent Number: 4,991,197
[45] Date of Patent: Feb. 5, 1991

[54] METHOD AND APPARATUS FOR CONTROLLING TRANSMISSION OF VOICE AND DATA SIGNALS

[75] Inventor: Walker C. Morris, Dallas, Tex.

[73] Assignee: Intelligence Technology Corporation, Dallas, Tex.

[21] Appl. No.: 239,787

[22] Filed: Sep. 1, 1988

[51] Int. Cl.⁵ ............................................. H04M 11/00
[52] U.S. Cl. ......................................... 379/58; 379/63; 379/94; 379/98
[58] Field of Search ................... 379/58, 57, 61, 63, 379/94, 98

[56] References Cited

U.S. PATENT DOCUMENTS

| | | | |
|---|---|---|---|
| 4,486,624 | 12/1984 | Puhl et al. | 379/60 |
| 4,503,288 | 3/1985 | Kessler | 379/57 |
| 4,591,661 | 5/1986 | Benedetto et al. | 379/61 |
| 4,650,931 | 3/1987 | Tsukada et al. | 379/61 |
| 4,706,274 | 11/1987 | Baker et al. | 379/61 |
| 4,741,018 | 4/1988 | Potratz et al. | 379/58 |
| 4,823,373 | 4/1989 | Takahashi et al. | 379/58 |

Primary Examiner—Jin F. Ng
Assistant Examiner—Jhancy Augustus
Attorney, Agent, or Firm—Timmons & Kelly

[57] ABSTRACT

The present invention provides a control circuit for controlling the path of voice and data signals in a communication system which comprises at least a speaker phone, a cellular transmit/receive unit (TRU), a cellular (CU) handset and a computer having at least a communications software program, a keyboard and an I/O port for communications. The control circuit receives voice and data signals from a plurality of different input sources and routes or switches the received voice and data signals to different selectable destinations. The control circuit comprises analog switching circuitry, a CPU, a modem, landline interface circuitry, TRU interface circuitry and cellular handset interface circuitry which are operatively connected together.

21 Claims, 6 Drawing Sheets

METHOD AND APPARATUS FOR CONTROLLING TRANSMISSION OF VOICE AND DATA SIGNALS

BACKGROUND OF THE INVENTION

1. Field of the Invention

The present invention relates in general to the transmission and reception of voice and data signals and, more particularly, to the control of the path of voice and data signals received from a plurality of different input sources and to the control of the path of voice and data signals transmitted to different destinations.

2. Description of the Prior Art

Portable computers such as lap-top computers are well known. Similarly, data networks such as those known as local area networks (LAN) are also well known. It is also well known to control radiotelephone transceivers by microprocessors as is disclosed in U.S. Pat. No. 4,486,624 of Puhl et al.

There have been numerous attempts in the past to combine general purpose computers, normally portable or lap-top computers, with various degrees of telephone transmission capability. It is certainly common and well established to have a built-in modem to modulate and demodulate signals between the computer and a telephone. U.S. Pat. No. 4,533,791 issued to Read et al shows a computer with a built-in conventional telephone. U.S. Pat. No. 4,577,068 of Kelly et al shows a telephone cradle which can be used with a computer or communication terminal. U.S. Pat. No. 4,571,456 of Paulsen et al shows a lap-top computer adapted to incorporate an acoustic coupler or telephone handset. A portable information display, which incorporates what appears to be a standard modem, is shown in U.S. Pat. No. 4,496,943 of Greenblatt. U.S. Pat. No. 4,602,127 of Neely et al discloses a vehicle computer which makes use of a communication's controller. A computer equipped with an infrared or other line-of-sight transmitter is shown in U.S. Pat. No. 4,456,793 of Baker et al.

The present invention is intended to provide a solution to various prior art deficiencies which include the inability to transmit voice and/or data signals by either cellular telephone or landline from a lap-top or portable computer and receive voice and/or data signals at the same lap-top or portable computer using a cellular handset, a speaker phone, a telephone-type headset and a modem.

SUMMARY OF THE INVENTION

The present invention provides a control circuit for controlling the path of voice and data signals in a communication system which comprises at least a speaker phone, a telephone-type headset, a cellular transmit/receive unit (TRU), a cellular (CU) handset and a computer having at least a communications software program, a keyboard and an I/O port for communications. The control circuit receives voice and data signals from a plurality of different input sources and routes or switches the received voice and data signals to different selectable destinations.

The control circuit comprises analog switching means, a CPU, a modem, landline interface means, TRU interface means and cellular (CU) handset interface means which are operatively connected together.

During the transmission mode of the communication system, the plurality of different input sources to the control circuit includes the microphone of the cellular (CU) handset, the microphone of the speaker phone, the microphone of the telephone-type headset and the output of the computer. The different selectable destinations from the control circuit during the transmission mode includes the cellular TRU or the landline.

During the reception mode of the communication system, the plurality of different input sources to the control circuit includes the cellular TRU or the landline. The different selectable destinations from the control circuit during the reception mode includes the speaker of the cellular (CU) handset, the speaker of the speaker phone, the speaker of the telephone-type headset and the input to the computer.

The method of controlling the path taken by the voice and/or data signals includes the possible activation of various switches by the operator and the transmission of control signals by the CPU upon receipt of various sense signals sent to the CPU by the various units comprising the communications system.

Among the advantages offered by the present invention is the capability to transmit or receive via the cellular phone system from the speaker phone, the telephone-type headset and the cellular (CU) handset. Voice signals may be transmitted or received via the landline from the speaker phone and the telephone-type headset. Data signals may be transmitted or received via the cellular phone system and the landline from the computer. All of the above noted capabilities are contained in a portable unit. The present invention allows the use of the speaker phone in the computer housing or the use of a standard or cellular telephone system as an extension to the computer for voice and/or data communications. The present invention allows the computer to be an isolated communication device.

Examples of the more important features and advantages of this invention have thus been summarized rather broadly in order that the detailed description thereof that follows may be better understood and in order that the contribution to the art may be better appreciated. There are, of course, additional features of the invention which will be described hereinafter and which will also form the subject of the claims appended hereto. Other features of the present invention will become apparent with reference to the following detailed description of a presently preferred embodiment thereof in connection with the accompanying drawing in which:

DESCRIPTION OF THE PREFERRED EMBODIMENT

Figure 1:
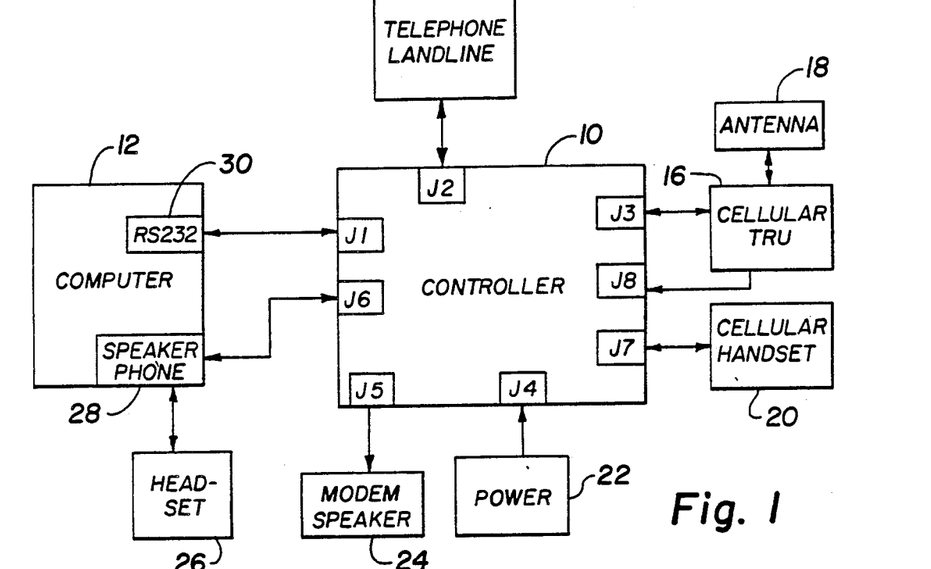
FIG. 1 is a simplified schematic, in block diagram form, of a communication system with which the present invention may be advantageously utilized.

Referring to the drawing, wherein like reference numerals designate like or corresponding elements throughout the several views, controller (controlling apparatus or apparatus for controlling) is referred to generally by reference 10. With reference to FIG. 1, controller 10 is connected to and interfaces with various units comprising a communication system which include at least a computer 12, telephone landline 14, cellular TRU (Transceiver Unit) 16, cellular (CU) handset 20, telephone-type headset 26 and speaker phone 28. Controller 10 is operatively connected to the RS-232 or I/O port 30 of computer 12 via connector J1, to the telephone landline 14 via connector J2, to the cellular TRU 16 via connectors J3 and J8, to the cellular (CU) handset 20 via connector J7, to a source of power 22 via connector J4, to a modem speaker 24 via connector J5 and to the speaker phone 28 via connector J6.

Figure 2:
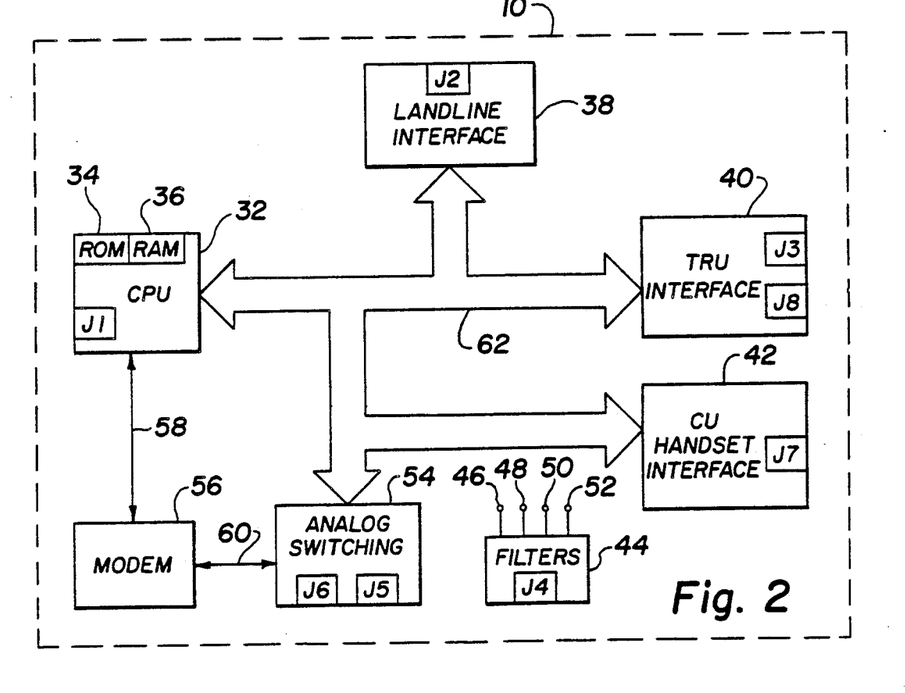
FIG. 2 is a simplified schematic, in block diagram form, of the present invention.

With reference to FIG. 2, controller 10 comprises various units including CPU (Central Processor Unit) 32 including ROM 34, which provides the program for the CPU 32, and RAM 36, which provides storage for the signals flowing within and through the CPU 32. CPU 32 connects to and interfaces with computer 12 through connector J1. Controller 10 also includes landline interface 38 for connecting to and interfacing with the telephone landline 14 through connector J2. TRU interface 40, in controller 10, connects to and interfaces with cellular TRU 16 through connectors J3 and J8. CU (cellular) handset interface 42, in controller 10, connects to and interfaces with cellular (CU) handset 20. Filter 44 receives various voltages from source of power 22, filters same and distributes the various levels of voltages to the various units over leads 46, 48, 50 and 52. Analog switching 54 connects to and interfaces with speaker phone 28 through connector J6 and with modem speaker 24 through connector J5. Controller 10 also includes modem 56 which connects to and interfaces with CPU 32 via cable 58 and with analog switching 54 via cable 60. CPU 32, landline interface 38, TRU interface 40, CU (cellular) handset interface 42 and analog switching 54 are operatively connected by multiple leads 62 for the exchange of sense signals and control signals.

Figure 3:
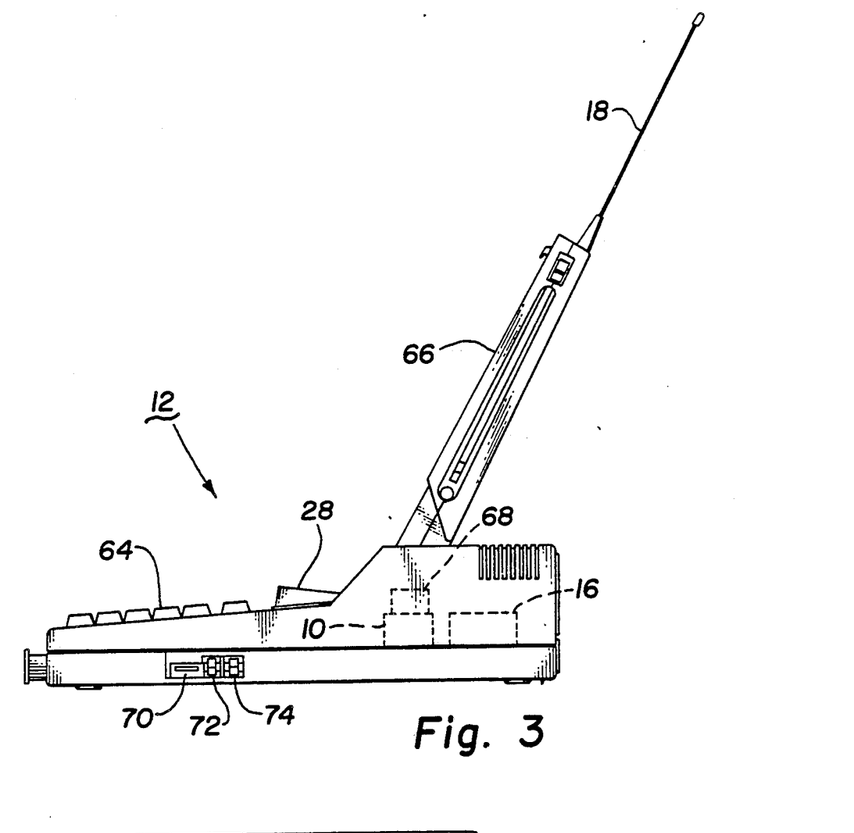
FIG. 3 is a simplified right side elevational view of a computer in which the present invention is installed and utilized.
Figure 4:
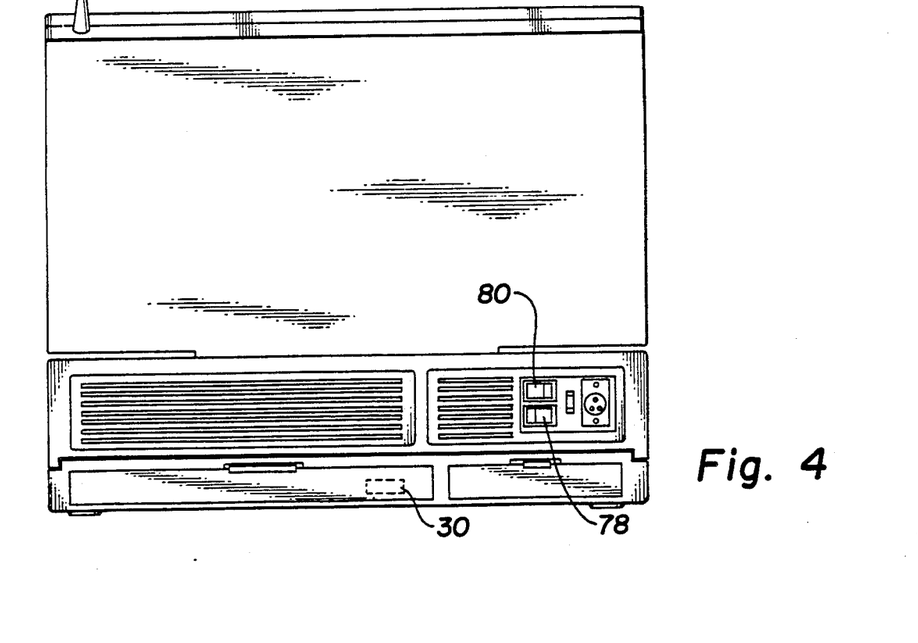
FIG. 4 is a simplified rear elevational view of a computer in which the present invention is installed and utilized.

With reference to FIGS. 3 and 4, in order to provide a unit which will accommodate the transfer of voice signals and data signals over either a cellular phone system or telephone-type landline, the present inventive controller 10 has been combined with and packaged in and with a lap-top computer 12, a cellular TRU 16, a cellular (CU) handset 20, and antenna 18, a telephone-type headset 26 and a speaker phone 28. It will be appreciated that the present inventive controller 10 could also be combined with and packaged in and with a desk-top computer.

Computer 12 includes at least a keyboard 64, the speaker phone 28, display screen 66, cellular TRU 16, antenna 18 for the cellular phone system and a communications software program 68 either in ROM or on a hard disk in computer 12 or on a floppy disc which can be loaded into the computer 12. In the preferred embodiment, the communications software program 68 includes a file transfer package. Also integrated into the overall package, is the volume control 70 for the speaker phone 28, jack 72 for the telephone-type headset 26 and jack 74 for the cellular (CU) handset 20.

With reference to FIG. 4, the cellular TRU Power-On switch 78 and the computer Power-On switch 80 are disclosed.

Figure 5:
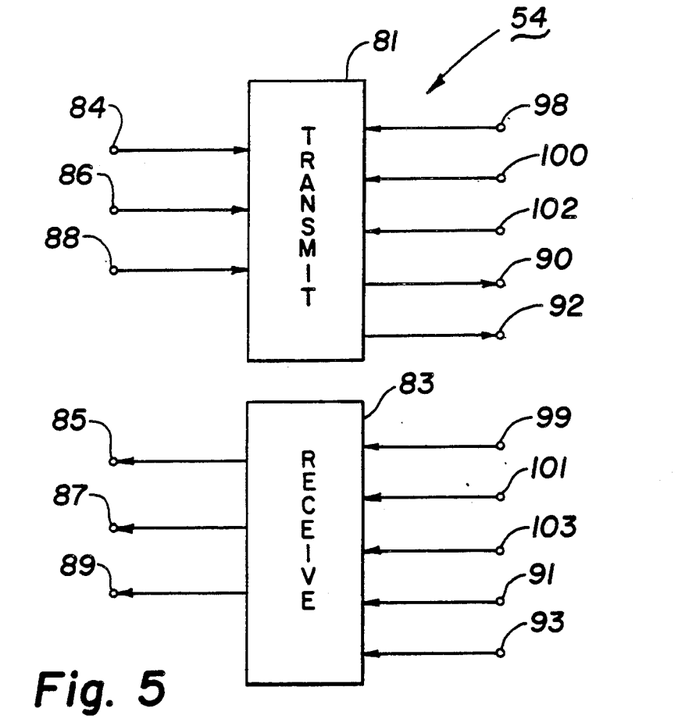
FIG. 5 is a simplified schematic, in block diagram form, of the analog switching means of the present invention.

With reference to FIG. 5, the analog switching means 54 for the transmission and reception of voice and data signals is disclosed. In the preferred embodiment, the analog switching means comprises two analog multiplexer/demultiplexer chips 81 and 83 (one for signals being transmitted and one for signals being received) such as 74HC4053B. With reference to the transmit chip 81, data signals from the modem 56 are input on lead 84, voice signals from the microphone of the cellular (CU) handset 20 are input on lead 86 and voice signals from the microphone of the speaker phone 28 are input on lead 88. If the telephone-type headset 26 is operatively plugged into jack 72, then the voice signals from the microphone of the telephone-type headset 26 are input on lead 88. It will be appreciated that when the telephone-type headset 26 is plugged into jack 72, then the telephone-type headset 26 replaces the speaker phone 28 and disconnects the speaker phone 28 from the circuit. Lead 92 is connected to the landline transmit lead 94 of the landline interface means 38 (see FIG. 8). Lead 90 is connected to the TRU transmit lead 96 of the TRU interface means 40 (see FIG. 7). Control signals from the CPU 32 are input on leads 98 (modem select), 100 (CU handset select) and 102 (speaker phone select) of analog switching means 54 and determine which of the input leads 84, 86 and 88 are connected to lead 92 (landline transmit) and when the particular lead is connected. These same control signals from the CPU 32 also determine which of the input leads 84, 86 and 88 are connected to lead 90 (TRU transmit) and when the particular lead is connected.

With reference to the received chip 83, data signals from lead 85 go to the input of modem 56, voice signals from lead 87 go to the speaker in the cellular (CU) handset 20 and voice signals from lead 89 go to the speaker of the speaker phone 28. If the telephone-type headset 26 is operatively plugged into jack 72, then the voice signals from lead 89 will go to the speaker of the telephone-type headset 26. Lead 91 is connected to the TRU receive lead 130 of the TRU interface means 40 (see FIG. 7). Lead 93 is connected to the landline receive lead 152 of the landline interface means 38 (see FIG. 8). Control signals from the CPU 32 are input on leads 99 (modem select), 101 (CU handset select) and 103 (speaker phone select) of analog switching means 54 and determine which of the output leads 85, 87 and 89 are connected to lead 93 (landline receive) and when the particular lead is connected. These same control signals from the CPU 32 also determine which of the output leads 85, 87 and 89 are connected to lead 91 (TRU receive) and when the particular lead is connected.

Figure 6:
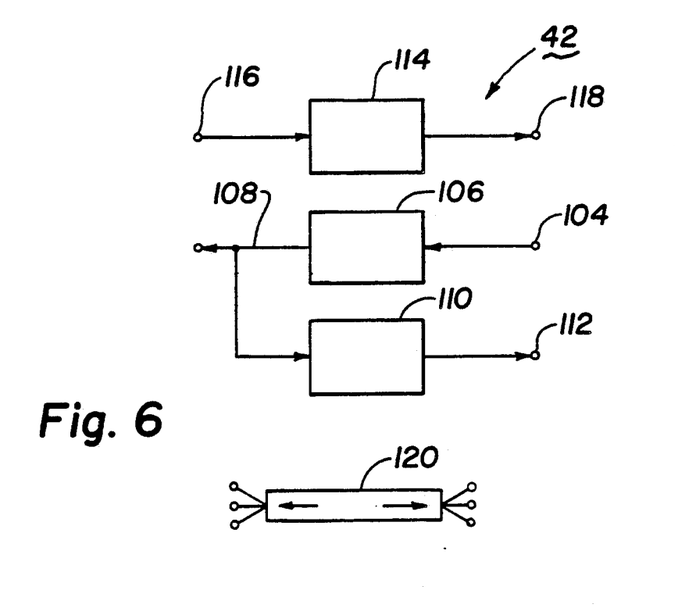
FIG. 6 is a simplified schematic, in block diagram form, of the cellular (CU) handset interface means of the present invention.

With reference to FIG. 6, the cellular interface means 42 for the transmission and reception of voice signals to and from the cellular (CU) handset 20 is disclosed and comprises lead 104 which is connected to the output of the power-on switch and the microphone of the cellular (CU) handset 20. When signals are being sent from the cellular (CU) handset 20, the signals on lead 104 are amplified by amplifier 106 and go to lead 86 of the analog switching means 54 via lead 108 and also to switch and relay means 110 which applies power back to the cellular (CU) handset 20 via lead 112. When signals are being sent to the cellular (CU) handset 20, the signals from the analog switching means 54 (for receiving) on output lead 87 are transmitted to amplifier 114 via lead 116 where they are amplified and sent to the speaker of the cellular (CU) handset 20 via lead 118. The normal clock, control signals, forward data, reverse data, etc. signals of the cellular system are fed to and from the CPU 32 and the TRU interface means 40 via multiple lead cable 120.

Figure 7:
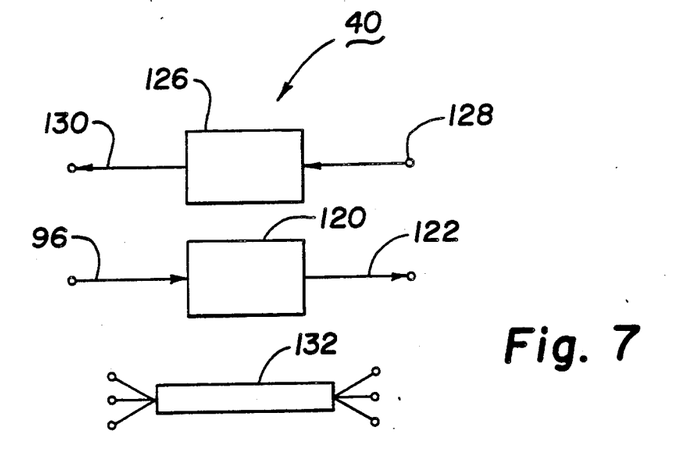
FIG. 7 is a simplified schematic, in block diagram form, of the TRU interface means of the present invention.

With reference to FIG. 7, the TRU interface means 40 for the transmission and reception of voice and data signals to and from the cellular TRU is disclosed and comprises lead 96 which receives the output from lead 90 of the analog switching means 54 and is input to amplifier 120. After amplification, the signal is sent to the cellular TRU 16 via lead 122 and then to antenna 18 for transmission over the cellular system. When signals are being received by the cellular TRU 16, they are sent to amplifier 126 via lead 128. The output of amplifier 126 is sent to the TRU receive input lead 91 of the analog switching means 54 via lead 130. The normal clock, control signals, forward data, reverse data, etc. signals, of the cellular system are fed to and from the CPU 32 and the CU handset interface means 42 via multiple lead cable 132.

Figure 8:
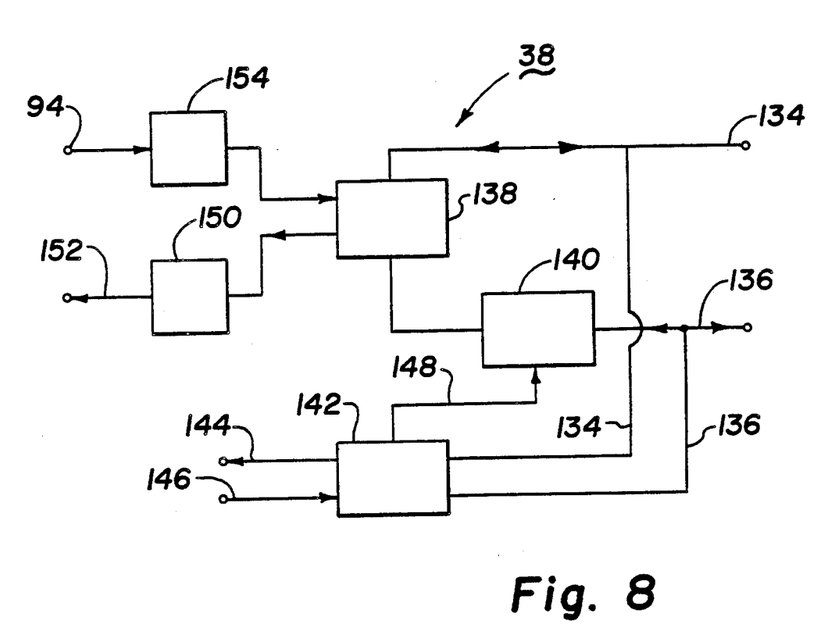
FIG. 8 is a simplified schematic, in block diagram form, of the landline interface means of the present invention.

With reference to FIG. 8, the landline interface means 38 for the transmission and reception of voice and data signals over the telephone landline 14 is disclosed and comprises leads 134 and 136 which connect to the telephone landline 14. Lead 134 is connected to transformer 138 (which isolates and protects the telephone company equipment) while lead 136 is connected to transformer 138 through switch and relay means 140. Coupling means 142 provides an indication to the CPU 32 over lead 144 when a ring voltage appears on leads 134 and 136. CPU 32 provides a control signal over lead 146 to coupling means 142 and on to the switch and relay means 140, via lead 148, to cause the switch and relay means 140 to connect lead 136 to transformer 138 and complete the circuit.

Voice and/or data signals received over the telephone landline 14 are passed through transformer 138 to amplifier 150 and on to the landline receive input lead 93 of the analog switching means 54 via lead 152. When voice and/or data signals are to be transmitted over the telephone landline 14, those signals will be sent from lead 92 (landline transmit) of the analog switching means 54 to lead 94, through amplifier 154, through transformer 138 to leads 134 and 136.

The various modes of operation are as follows:
(1) a voice cellular call (originate or answer)
  (a) using the cellular handset
  (b) using the speaker phone
  (c) using the telephone-type headset
(2) a voice call via telephone landline (originate or answer)
  (a) using the speaker phone
  (b) using the telephone-type headset
(3) data transmission or reception via cellular phone system
(4) data transmission or reception via telephone landline When computer 12 is turned ON, power is also applied to controller 10 and CPU 32 initializes and the communication system defaults to the mode of telephone landline 14 and the speaker phone 28. A control signal is sent from CPU 32 to the speaker phone select lead 102 of analog switching 54 which connects the speaker phone microphone lead 88 to the landline transmit lead 92. A control signal is also sent from CPU 32 to the speaker phone select lead 103 of analog switching 54 which connects the speaker phone speaker lead 89 to the landline receive lead 93. To provide voice communications via the telephone landline 14, the communications software program in the computer 12 must be brought up and activated. To transmit voice signals using the speaker phone 28, the desired telephone number and associated coding must be input on the keyboard of the computer 12 and then a two-way conversation may be completed. To receive and answer a phone call from a remote party, the proper coding (command to answer) must be input on the keyboard of the computer 12.

If you wish to use to the telephone-type headset 26 during the phone conversation, just plug the telephone-type headset 26 into jack 72 and the speaker phone 28 will be disconnected and other parties around you cannot listen to the voice signals you receive. To place a call or receive a call via the telephone landline 14 using the telephone-type headset 26, the procedure is the same as discussed above for the speaker phone 28.

If you wish to make a voice call over the cellular phone system using the cellular (CU) handset, turn on the cellular TRU 16 (switch 78) and turn on the switch on the cellular (CU) handset 20. A control signal is sent from CPU 32 to the CU select lead 100 of analog switching 54 which connects the microphone of the cellular (CU) handset 20 to the TRU transmit lead 90. A control signal is also sent from CPU 32 to the CU select lead 101 of analog switching 54 which connects the speaker of the cellular (CU) handset 20 to the TRU receive lead 91. To transmit voice signals (make a phone call), the desired telephone number is dialed on the keypad of the cellular (CU) handset 20. To receive voice signals (receive a phone call) when you hear the cellular phone system ring, just press the Send Key on the cellular (CU) handset 20.

If you wish to make a call over the cellular phone system using the speaker phone 28, turn on the cellular TRU (switch 78) and the computer (switch 80). A control signal is sent from CPU 32 to the speaker phone select lead 102 of analog switching 54 which connects the speaker phone microphone lead 88 to the TRU transmit lead 90. A control signal is also sent from CPU 32 to the speaker phone select lead 103 of analog switching 54 which connects the speaker phone speaker lead 89 to the TRU receive lead 91. To provide voice communications via the cellular TRU 16 with the speaker phone, the communications software program in the computer 12 must be brought up and activated. To transmit voice signals using the speaker phone 28, the desired telephone number and associated coding must be input on the keyboard of the computer 12 and then a two-way conversation may be completed. To receive and answer a call from a remote party, the proper coding (command to answer) must be input on the keyboard of the computer 12.

If you wish to use the telephone-type headset 26 during the phone conversation, just plug the telephone-type headset 26 into jack 72 and the speaker phone 28 will be disconnected and other parties around you cannot listen to the voice signals you receive. To place a call or receive a call via the cellular TRU 16 using the telephone-type headset 26, the procedure is the same as discussed above for the speaker phone 28.

If you wish to send data signals from the computer 12 via the cellular TRU, turn on the cellular TRU 16 (switch 78) and turn on the computer 12 (switch 80). A control signal is sent from CPU 32 to the modem select lead 98 of analog switching 54 which connects the modem output lead 84 to the TRU transmit lead 90. A control signal is also sent from CPU 32 to the modem select lead 99 of analog switching 54 which connects the modem input lead 85 to the TRU receive lead 91. To provide data communications via the cellular TRU 16, the communications software program in the computer 12 must be brought up and activated. To transmit data signals from the computer 12, the desired telephone number and associated coding must be input on the keyboard of the computer 12 and then the data is transferred. To receive data signals from a remote computer, either the proper commands must be input on the keyboard of the computer 12 or a program such as Auto Answer must be brought up and activated.

If you wish to send data signals from the computer 12 via the landline, turn on the computer 12 (switch 80). A control signal is sent form CPU 32 to the modem select lead 98 of analog switching 54 which connects the modem output lead 84 to the landline transmit lead 92. A control signal is also sent from CPU 32 to the modem select lead 99 of analog switching 54 which connects the modem input lead 85 to the landline receive lead 93. To provide data communications via the landline with the computer 12, the communications software program in the computer 12 must be brought up and activated. To transmit data signals from the computer 12, the desired telephone number and associated coding must be input on the keyboard of the computer 12 and then the data is transferred. To receive data signals from a remote computer, either the proper commands must be input on the keyboard of the computer 12 or a program such as Auto Answer must be brought up and activated.

Figure 9A:
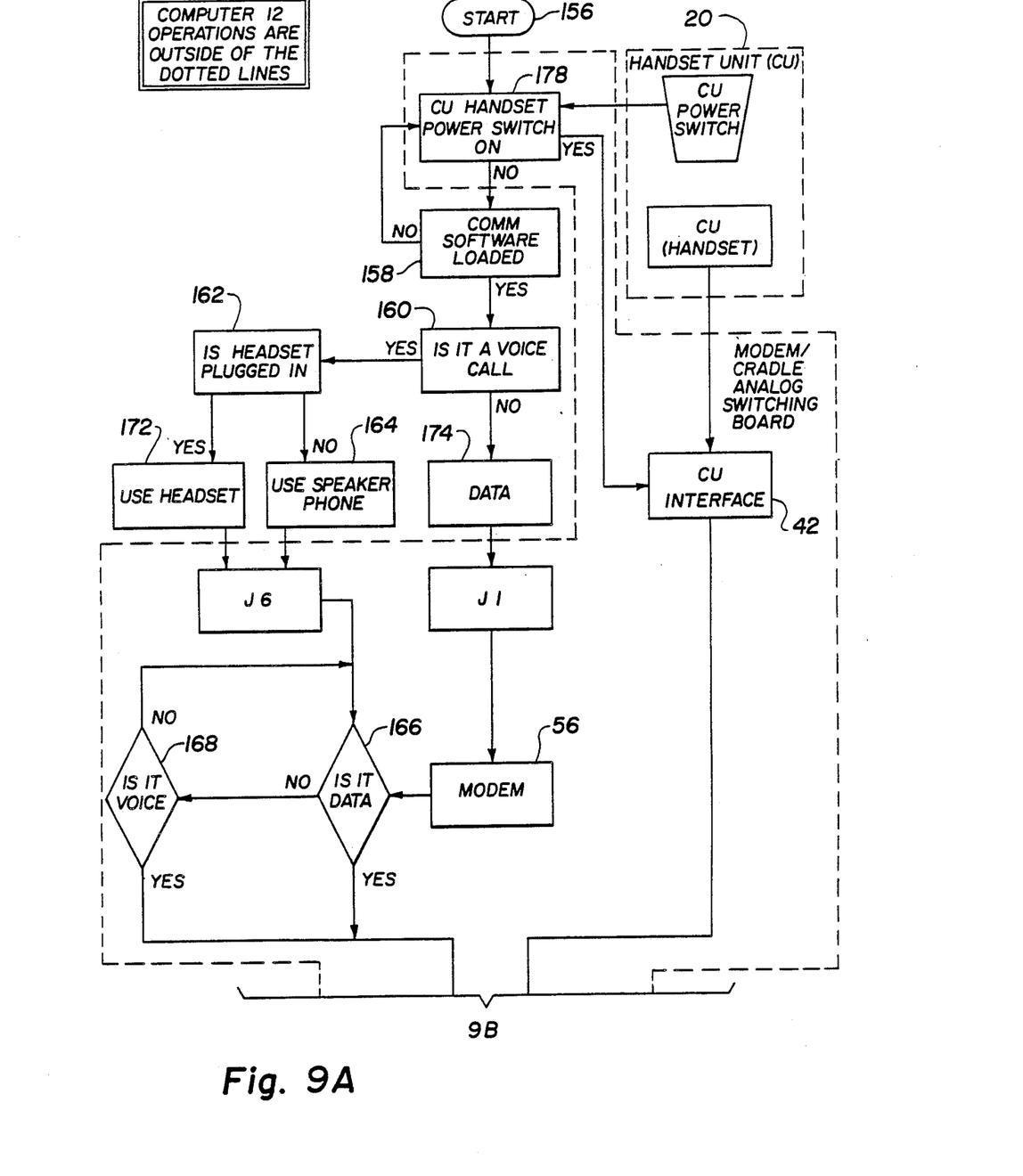
FIG. 9A and 9B, when arranged together, show a simplified flow chart illustrating the operation of the overall system utilizing the present invention.
Figure 9B:
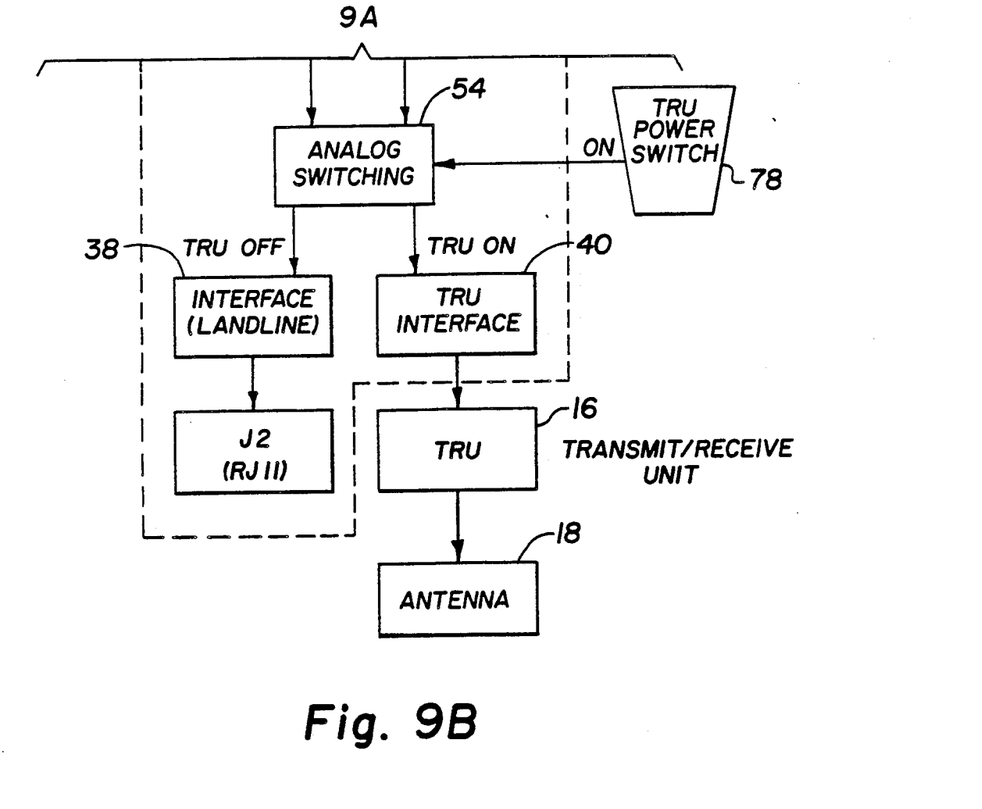

From a flow-type aspect and with reference to FIGS. 1–9 and with particular emphasis on FIGS. 9 and 2, the operation of the preferred embodiment is initiated (START 156) by placing the computer power-on switch 80 to the ON position. In the preferred embodiment, power to controller 10, through J4, is provided when either the computer Power-on switch 80 or the cellular TRU Power-on switch 78 is placed in the ON position. It will be appreciated that power could be provided to controller 10 from its own source. CPU 32 initializes and sends control signals over multiple leads 62 to provide a default or start mode of landline and speaker phone for the system. In order to simplify FIG. 9, CPU 32 and its interfacing leads to the various decision blocks have not been included.

With the system defaulted to landline 14 and speaker phone 28, if the operator wants to place a voice call via landline using the speaker phone (mode of operation 2a), the operator activates the communications software program in the computer 12 (Comm Software Loaded 158), dials the desired telephone number (including a predetermined code to tell the software that it is a voice call—Is it a voice call 160) from the computer keyboard 64. Since the telephone-type headset 26 is not plugged in (Is headset plugged in 162), the speaker phone 28 is being used (Use speaker phone 164) and the output thereof is sent to J6. Since it is not data (Is it data 166) and it is voice signals (Is it voice 168), the voice signals from the speaker phone 28 are sent to the analog switching 54 which has been switched or configured (by control signals from the CPU 32) to send the voice signals from the speaker phone to the landline interface 38 and on to the telephone landline 14 via J2.

If the operator desires to send a voice call via landline using the telephone-type headset (mode of operation 2b), the operator does the same as set forth in the previous paragraph except the operator engages or plugs-in the telephone-type headset 26 and the decision from (Is headset plugged in 162) now goes to (Use headset 172) and to J6 and then the voice signals follow the same path, as set forth in the previous paragraph, to J2 and telephone landline 14.

If the operator desires to send data via the telephone landline (mode of operation 4), the operator activates the communications software program in the computer 12 (Comm Software Loaded 158), dials the desired telephone number (including a predetermined code to tell the software that it is a data call—Is it a voice call 160). Since it is not a voice call, the flow goes to DATA 174, on to J1 and then to the modem 56. The answer to (Is it data 166) is Yes so the data path is to analog switching 54 which has been switched or configured (by control signals from the CPU 32) to send the data signals from the modem to the landline interface 38 and on to the telephone landline 14 via J2.

If the operator desires to send a voice call via the cellular system using the cellular handset (mode of operation 1a), the operator would place the (CU power switch on 176) on the cellular handset to the ON position and also place the TRU power on switch 78 to the ON position. These switches would send the proper sense signals to the CPU 32. Since the answer to the question of whether the (CU Power Switch on 178) is YES, then the CU interface 42 applies power to the cellular (CU) handset 20. The voice signals from the cellular (CU) handset 20 go to the CU interface 42 and on to the analog switching 54 which has been switched or configured (by control signals from the CPU 32) to send the voice signals from the microphone of the CU handset 20 to the TRU interface 40. The voice signals would then be sent on to the TRU 16 and radiated via antenna 18 to the external cellular system.

If the operator desires to send a voice call via the cellular system using the speaker phone (mode of operation 1b), the operator would place the TRU power on switch 78 to the ON position, would activate the communications software program in the computer 12 (Comm Software Loaded 148), dials the desired telephone number (including a predetermined code to tell the software that it is a voice call—Is is a voice call 160) from the computer keyboard 64. Since the telephone-type headset 26 is not plugged in (Is headset plugged in 162), the speaker phone 28 is being used (Use speaker phone 164) and the output thereof is sent to J6. Since it is not data (Is it data 166) and it is voice signals (Is it voice 168), the voice signals from the speaker phone 28 are sent to the analog switching 54 which has been switched or configured (by control signals from the CPU 32) to send the voice signals from the speaker phone to the TRU interface 40. The voice signals would then be sent on to the TRU 16 and radiated via antenna 18 to the external cellular system.

If the operator desires to send a voice call via the cellular system using the telephone-type headset (mode of operation 1c), the operator does the same as set forth in the previous paragraph except the operator engages or plugs-in the telephone-type headset 26 and the decision from (Is headset plugged in 162) now goes to (Use headset 172) and to J6 and then the voice signals follow the same path, as set forth in the previous paragraph, to TRU 16 and radiated via antenna 18 to the external cellular system.

If the operator desires to send data via the cellular system (mode of operation 3), the operator places the TRU power on switch 78 to the ON position, activates the communications software program in the computer 12 (Comm Software Loaded 158), dials the desired telephone number (including a predetermined code to tell the software that it is a data call—Is is a voice call 160). Since it is not a voice call, the flow goes to DATA 174, on to J1 and then to the modem 56. The answer to (Is it data 166) is Yes so the data path is to analog switching 54 which has been switched or configured (by control signals from the CPU 32) to send the data signals from the modem to the TRU interface 40 and then to the TRU 16 and antenna 18.

Although the present invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined in the appended claims.

What is claimed is:

1. Apparatus for controlling the path of voice and data signals in a communications system which comprises at least a speaker phone, a cellular transmit/receive unit (TRU), a cellular (CU) handset and a computer having at least a communications software program, a keyboard and an I/O port for communications, said apparatus for controlling comprising:
analog switching means structured to receive voice signals and data signals from a plurality of different predetermined input sources and to route the received voice signals and data signals to different predetermined selectable destinations, said routing being determined by control signals received by said analog switching means;
landline interface means operatively connected to said analog switching means, said landline interface means being structured to be connected to a landline;
TRU interface means operatively connected to said analog switching means, said TRU interface means being structured to be connected to the cellular transmit/receive unit;
cellular interface means operatively connected to said analog switching means, said cellular interface means being structured to be connected to the cellular (CU) handset;
speaker phone interface means operatively connected to said analog switching means, said speaker phone interface means being structured to be connected to the speaker phone;
a modem operatively connected to said analog switching means; and
a central processing unit operatively connected to said analog switching means, landline interface means, TRU interface means, cellular interface means and said modem to receive sense signals therefrom and to send control signals thereto, said central processing unit being structured to be connected to the I/O port for communications of the computer.

2. The apparatus of claim 1 wherein said analog switching means comprises at least one analog multiplexer/demultiplexer unit operatively connected to receive an input from any one of said plurality of different predetermined input sources and provide an output to one of said different predetermined selectable destinations, said plurality of different predetermined input sources comprises the microphone of the cellular (CU) handset through the cellular interface means, the microphone of the speaker phone through the speaker phone interface means and the output of the modem, said different predetermined selectable destinations comprises the cellular transmit/receive unit through the TRU interface means and the landline through the landline interface means.

3. The apparatus of claim 1 wherein said analog switching means comprises at least one analog multiplexer/demultiplexer unit operatively connected to receive an input from any one of said plurality of different predetermined input sources and provide an output to one of said different predetermined selectable destinations, said plurality of different predetermined input sources comprises the cellular transmit/receive unit through the TRU interface means and the landline through the landline interface means, said different predetermined selectable destinations comprises the speaker of the cellular (CU) handset through the cellular interface means, the speaker of the speaker phone through the speaker phone interface means and the input of the modem.

4. The apparatus of claim 1 wherein said cellular interface means comprises amplifier means to amplify the signals from the microphone of said cellular (CU) handset to the analog switching means and to amplify the signals from the analog switching means to the speaker of said cellular (CU) handset.

5. The apparatus of claim 1 wherein said TRU interface means comprises amplifier means to amplify the signals from the analog switching means to the cellular transmit/receive unit and to amplify the signals to the analog switching means from the cellular transmit/receive unit.

6. The apparatus of claim 1 wherein said landline interface means comprises amplifier means to amplify the signals from the landline to the analog switching means and to amplify the signals to the landline from the analog switching means.

7. The apparatus of claim 1 wherein said computer, said speaker phone, said cellular transmit/receive unit, said cellular (CU) handset and said apparatus for controlling are built into a single portable unit.

8. In combination:
- a computer having at least a communications software program, a keyboard and an I/O port for communications;
- a speaker phone having at least a speaker and a microphone;
- a cellular transmit/receive unit (TRU) and a cellular (CU) handset, said cellular (CU) handset including a microphone and a speaker;
- apparatus for controlling the path of voice and data signals from and to said computer, said speaker phone, said cellular transmit/receive unit (TRU) and said cellular (CU) handset, said apparatus for controlling comprising:
  - analog switching means structured to receive voice signals and data signals from a plurality of different predetermined input sources and to route the received voice signals and data signals to different predetermined selectable destinations, said routing being determined by control signals received by said analog switching means;
  - landline interface means operatively connected to said analog switching means, said landline interface means being structured to be connected to a landline;
  - TRU interface means operatively connected to said analog switching means, said TRU interface means being structured to be connected to the cellular transmit/receive unit;
  - cellular interface means operatively connected to said analog switching means, said cellular interface means being structured to be connected to the cellular (CU) handset;
  - speaker phone interface means operatively connected to said analog switching means, said speaker phone interface means being structured to be connected to the speaker phone;
  - a modem operatively connected to said analog switching means; and
  - a central processing unit operatively connected to said analog switching means, landline interface means, TRU interface means, cellular interface means and said modem to receive sense signals therefrom and to send control signals thereto, said central processing unit being structured to be connected to the I/O port for communications of the computer.

9. The apparatus of claim 8 wherein said analog switching means comprises at least one analog multiplexer/demultiplexer unit operatively connected to receive an input from any one of said plurality of different predetermined input sources and provide an output to one of said different predetermined selectable destinations, said plurality of different predetermined input sources comprises the microphone of the cellular (CU) handset through the cellular interface means, the microphone of the speaker phone through the speaker phone interface means and the output of the modem, said different predetermined selectable destinations comprises the cellular transmit/receive unit through the TRU interface means and the landline through the landline interface means.

10. The combination of claim 8 wherein said analog switching means comprises at least one analog multiplexer/demultiplexer unit operatively connected to received an input from any one of said plurality of different predetermined input sources and provide an output to one of said different predetermined selectable destinations, said plurality of different predetermined input sources comprises the cellular transmit/receive unit through the TRU interface means and the landline through the landline interface means, said different predetermined selectable destinations comprises the speaker of the cellular (CU) handset through the cellular interface means, the speaker of the speaker phone through the speaker phone interface means and the input of the modem.

11. The combination of claim 8 wherein said cellular interface means comprises amplifier means to amplify the signals from the microphone of said cellular (CU) handset to the analog switching means and to amplify the signals from the analog switching means to the speaker of said cellular (CU) handset.

12. The combination of claim 8 wherein said TRU interface means comprises amplifier means to amplify the signals from the analog switching means to the cellular transmit/receive unit and to amplify the signals to the analog switching means from the cellular transmit/receive unit.

13. The combination of claim 8 wherein said landline interface means comprises amplifier means to amplify the signals from the landline to the analog switching means and to amplify the signals to the landline from the analog switching means.

14. The combination of claim 8 wherein said computer, said speaker phone, said cellular transmit/receive unit, said cellular (CU) handset and said apparatus for controlling are built into a single portable unit.

15. A method of controlling the path of voice signals in a communications system which comprises at least a speaker phone, a cellular transmit/receive unit (TRU) having a telephone number, a cellular (CU) handset, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communications, said method comprising the steps of:
- placing the power switch of the cellular TRU to the ON position applying power to the cellular TRU;
- sending a sense signal to the CPU indicating the power switch of the cellular TRU has been placed to the ON position;
- placing the power switch of the cellular (CU) handset to the ON position;
- sending a sense signal to the CPU indicating the power switch of the cellular (CU) handset has been placed to the ON position;
- sending a control signal from the CPU to the cellular interface means to cause power to be applied to the cellular (CU) handset; and
- sending control signals from the CPU to the analog switching means to cause the analog switching means to switch the output of the microphone of the cellular (CU) handset to the transmit input of the cellular TRU through the TRU interface means and to cause the analog switching means to switch the receive output of the cellular TRU to the speaker of the cellular (CU) handset through the TRU interface means;

thereby allowing voice signals to be transmitted to and received from a location whose telephone number has been dialed on the cellular (CU) handset and also allowing voice signals to be received from and transmitted to a location which has dialed the telephone number of the cellular TRU and the cellular (CU) handset.

16. A method of controlling the path of voice signals in a communications system which comprises at least a speaker phone, a cellular transmit/receive unit (TRU) having a telephone number, a cellular (CU) handset, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communications, said method comprising the steps of:

placing the power switch of the cellular TRU to the ON position applying power to the cellular TRU;

sending a sense signal to the CPU indicating the power switch of the cellular TRU has been placed to the ON position;

placing the power switch of the computer to the ON position applying power to the computer;

activating the speaker phone;

sending a sense signal to the CPU indicating the speaker phone has been activated;

sending control signals from the CPU to the analog switching means to cause the analog switching means to switch the output of the microphone of the speaker phone to the transmit input of the cellular TRU through the TRU interface means and to cause the analog switching means to switch the receive output of the cellular TRU to the speaker of the speaker phone through the TRU interface means; and     activating the communications software program in the computer;

thereby allowing voice signals to be transmitted to and received from a location whose telephone number and associated coding has been input on the keyboard of the computer and also allowing voice signals to be received from and transmitted to a location which has dialed the telephone number of the cellular phone system and a proper command-to-answer coding has been input on the keyboard of the computer.

17. A method of controlling the path of voice signals in a communications system which comprises at least a speaker phone, a telephone-type headset, a cellular transmit/receive unit (TRU) having a telephone number, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communication, said method comprising the steps of:

placing the power switch of the cellular TRU to the ON position applying power to the cellular TRU;

sending a sense signal to the CPU indicating the power switch of the cellular TRU has been placed to the ON position;

placing the power switch of the computer to the ON position applying power to the computer;

activating the telephone-type headset;

sending a sense signal to the CPU indicating the telephone-type headset has been activated;

sending control signals to cause the analog switching means to switch the output of the microphone of the telephone-type headset to the transmit input of the cellular TRU through the TRU interface means and to cause the analog switching means to switch the receive output of the cellular TRU to the speaker of the telephone-type headset through the TRU interface means; and     activating the communications software program in the computer;

thereby allowing voice signals to be transmitted to and received from a location whose telephone number and associated coding has been input on the keyboard of the computer and also allowing voice signals to be received from and transmitted to a location which has dialed the telephone number of the cellular phone system and a proper command-to-answer coding has been input on the keyboard of the computer.

18. A method of controlling the path of voice signals in a communications system which comprises at least a speaker phone, a cellular transmit/receive unit (TRU) having a telephone number, a cellular (CU) handset, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communications, said method comprising the steps of:

placing the power switch of the computer to the ON position applying power to the computer;

activating the speaker phone;

sending a sense signal to the CPU indicating the speaker phone has been activated;

sending control signals from the CPU to the analog switching means to cause the analog switching means to switch the output of the microphone of the speaker phone to the landline through the transmit lead of the landline interface means and to cause the analog switching means to switch the output of the landline, through the receive lead of the landline interface means, to the speaker of the speaker phone; and     activating the communications software program in the computer;

thereby allowing voice signals to be transmitted to and received from a location whose telephone number and associated coding has been input on the keyboard of the computer and also allowing voice signals to be received from and transmitted to a location which has dialed the landline telephone number of the system and a proper command-to-answer coding has been input on the keyboard of the computer.

19. A method of controlling the path of voice signals in a communications system which comprises at least a speaker phone, a telephone-type headset, a cellular transmit/receive unit (TRU) having a telephone number, a cellular (CU) handset, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communications, said method comprising the steps of:

- placing the power switch of the computer to the ON position applying power to the computer;
- activating the telephone-type headset;
- sending a sense signal to the CPU indicating the telephone-type headset has been activated;
- sending control signals from the CPU to the analog switching means to cause the analog switching means to switch the output of the microphone of the telephone-type headset to the landline through the landline interface means and to cause the analog switching means to switch the output of the landline, through the receive lead of the landline interface means, to the speaker of the telephone-type headset; and
- activating the communications software program in the computer;
- thereby allowing voice signals to be transmitted to and received from a location whose telephone number and associated coding has been input on the keyboard of the computer and also allowing voice signals to be received from and transmitted to a location which has dialed the landline telephone number of the system and a proper command-to-answer coding has been input on the keyboard of the computer.

20. A method of controlling the path of data signals in a communications system which comprises at least a speaker phone, a cellular transmit/receive unit (TRU) having a telephone number, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communications, said method comprising the steps of:

- placing the power switch of the cellular TRU to the ON position applying power to the cellular TRU;
- sending a sense signal to the CPU indicating the power switch of the cellular TRU has been placed to the ON position;
- placing the power switch of the computer to the ON position applying power to the computer;
- sending control signals from the CPU to the analog switching means to cause the analog switching means to switch the output of the modem to the transmit input of the cellular TRU through the TRU interface means and to cause the analog switching means to switch the receive output of the cellular TRU to the input of the modem through the TRU interface means; and
- activating the communications software program in the computer;
- thereby allowing data signals to be transmitted to and received from a location whose telephone number and associated coding has been input on the keyboard of the computer and also allowing data signals to be received from and transmitted to a location which has dialed the telephone number of the cellular phone system and a proper command-to-answer coding has been input on the keyboard of the computer.

21. A method of controlling the path of data signals in a communications systems which comprises at least a speaker phone, a cellular transmit/receive unit (TRU) having a telephone number, a cellular (CU) handset, apparatus for controlling the path of voice and data signals having at least a CPU, an analog switching means, a TRU interface means, a landline interface means, a speaker phone interface means, a modem and a cellular interface means and a computer having at least a communications software program, a keyboard and an I/O port for communications, said method comprising the steps of:

- placing the power switch of the computer to the ON position applying power to the computer;
- sending a control signal from the CPU to the analog switching means to cause the analog switching mean to switch the output of the modem to the landline through the transmit lead of the landline interface means and to cause the analog switching means to switch the output of the landline, through the receive lead of the landline interface means, to the input of the modem; and
- activating the communications software program in the computer;
- thereby allowing data signals to be transmitted to and received from a location whose telephone number and associated coding has been input on the keyboard of the computer and also allowing data signals to be received from and transmitted to a location which has dialed the landline telephone number of the system and a proper command-to-answer coding has been input on the keyboard of-the computer.

* * * * *